(12) United States Patent
Abercrombie

(10) Patent No.: US 10,375,398 B2
(45) Date of Patent: Aug. 6, 2019

(54) LIGHTFIELD COMPRESSION FOR PER-PIXEL, ON-DEMAND ACCESS BY A GRAPHICS PROCESSING UNIT

(71) Applicant: Google Inc., Mountain View, CA (US)

(72) Inventor: Stuart Abercrombie, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 45 days.

(21) Appl. No.: 15/468,741

(22) Filed: Mar. 24, 2017

(65) Prior Publication Data
US 2018/0278939 A1 Sep. 27, 2018

(51) Int. Cl.
| | | |
|---|---|---|
| G06K 9/00 | (2006.01) |
| H04N 19/146 | (2014.01) |
| H04N 19/139 | (2014.01) |
| H04N 19/182 | (2014.01) |
| H04N 19/186 | (2014.01) |
| H04N 19/127 | (2014.01) |
| H04N 19/436 | (2014.01) |
| H04N 19/433 | (2014.01) |

(Continued)

(52) U.S. Cl.
CPC ............ *H04N 19/146* (2014.11); *G06T 1/20* (2013.01); *H04N 19/127* (2014.11); *H04N 19/139* (2014.11); *H04N 19/182* (2014.11); *H04N 19/186* (2014.11); *H04N 19/433* (2014.11); *H04N 19/436* (2014.11); *H04N 19/46* (2014.11); *H04N 19/12* (2014.11); *H04N 19/176* (2014.11); *H04N 19/70* (2014.11)

(58) Field of Classification Search
CPC .. H04N 19/146; H04N 19/127; H04N 19/139; H04N 19/182; H04N 19/186; H04N 19/433; H04N 19/436; G06T 1/20
See application file for complete search history.

(56) References Cited

U.S. PATENT DOCUMENTS

| | | | | |
|---|---|---|---|---|
| 6,476,805 B1 * | 11/2002 | Shum | ............... | G06T 7/97 345/420 |
| 6,937,770 B1 * | 8/2005 | Oguz | ............... | H04N 19/176 375/240.2 |

(Continued)

OTHER PUBLICATIONS

International Search Report and Written Opinion for PCT Application No. PCT/US2017/058711, 21 pages.

(Continued)

*Primary Examiner* — Bhavesh M Mehta
*Assistant Examiner* — Ian L Lemieux

(57) ABSTRACT

A first processing unit, such as a CPU, is configured to encode information that represents values of pixels in a block of an image in a lightfield dataset at a first bit rate that is selected from a plurality of bit rates and generate a block descriptor that includes information indicating locations of the encoded information for each pixel. A memory is configured to store the block descriptor and the encoded information in a format that is accessible by a second processing unit, such as a GPU, on a pixel-by-pixel basis. The second processing unit is configured to access, on the pixel-by-pixel basis, the encoded information representative of a value of a pixel in the block, decode the encoded information, and render the value of the pixel for presentation on a display.

32 Claims, 10 Drawing Sheets

(51) Int. Cl.
*G06T 1/20* (2006.01)
*H04N 19/46* (2014.01)
*H04N 19/176* (2014.01)
*H04N 19/70* (2014.01)
*H04N 19/12* (2014.01)

(56) References Cited

U.S. PATENT DOCUMENTS

| | | | |
|---|---|---|---|
| 8,155,456 | B2 | 4/2012 | Babacan et al. |
| 2013/0242051 | A1 | 9/2013 | Balogh |
| 2015/0189302 | A1 | 7/2015 | Pu et al. |
| 2015/0201176 | A1 | 7/2015 | Graziosi et al. |
| 2016/0021355 | A1 | 1/2016 | Alpaslan et al. |
| 2017/0251204 | A1 | 8/2017 | Gupte et al. |
| 2018/0020204 | A1* | 1/2018 | Pang .................. H04N 13/344 |
| 2018/0035134 | A1* | 2/2018 | Pang .................. H04N 19/597 |

OTHER PUBLICATIONS

Microsoft, Block Compression (Direct3D 10), < https://msdn.microsoft.com/en-us/library/windows/desktop/bb694531(v=vs.85).aspx>, Accessed Jun. 13, 2017, 16 pages.
P. Deutsch, Deflate Compressed Data Format Specification version 1.3, < https://tools.ietf.org/html/rfc1951>, Accessed Jun. 13, 2017, 17 pages.
Steven J. Gortler et al. "The Lumigraph", Proceedings of the 23rd Annual Conference on Computer Graphics and Interactive Techniques, Aug. 1996, 10 pages.
P. Krajcevski et al. "VBTC: GPU-Friendly Variable Block Size Texture Encoding", Eurographics vol. 35, No. 2, Computer Graphics Forum, 2016, 10 pages.
Marc Levoy et al. "Light Field Rendering", Proceedings of the 23rd Annual Conference on Computer Graphics and Interactive Techniques, Aug. 1996, 12 pages.
J. Nystad et al. "Adaptive Scalable Texture Compression", Proceedings of the Fourth ACM SIGGRAPH / Eurographics conference on High-Performance Graphics, Jun. 25-27, 2012, 10 pages.
The Khronos Group, "OpenGL ES Version 3.2 (Nov. 3, 2016)", <https://www.khronos.org/registry/OpenGL/specs/es/3.2/es_spec_3.2.pdf>, Accessed Jun. 13, 2017, 592 pages.
rover@google.com, "Lightfield Compression Using VP9", Mar. 1, 2016, 10 pages.
J. Ström et al. "iPACKMAN: High-Quality Low-Complexity Texture Compression for Mobile Phones", Proc. ACM Siggraph/Eurographics Conf. Graphics Hardware, 2005, 9 pages.
J. Ström et al. "ETC2: Texture Compression Using Invalid Combinations", Proceedings of the 22nd ACM SIGGRAPH/Eurographics Symposium on Graphics hardware, Aug. 4-5, 2007, 7 pages.
Microsoft, Texture Block Compression in Direct3D 11, <https://msdn.microsoft.com/en-us/library/windows/desktop/hh308955(v=vs.85).aspx>, Accessed Jun. 13, 2017, 5 pages.
WEBM, VP9 Video Codec, <https://www.webmproject.org/vp9/>, Accessed Jun. 13, 2017, 3 pages.
M. Magnor et al. "Adaptive Block-Based Light Field Coding", Proc. 3rd International Workshop on Synthetic and Natural Hybrid Coding and Three-Dimensional Imaging, Sep. 1999, 4 pages.
M. Olano et al. "Variable Bit Rate GPU Texture Compression", Comput. Graph. Forum, vol. 30, No. 4, 2011, 10 pages.
ARM-software/astc-encoder, <https://github.com/ARM-software/astc-encoder>, Accessed Jun. 27, 2017, 4 pages.
Fraunhofer Heinrich Hertz Institute, Multiview High Efficiency Video Coding (MV-HEVC), <https://hevc.hhi.fraunhofer.de/mvhevc>, Accessed Jun. 27, 2017, 2 pages.
J.M.P. Van Waveren, "Real-Time DXT Compression", Id Software, Inc., May 20, 2006, 42 pages.
J.M.P. Van Waveren et al., "Real-Time YCoCg-DXT Compression", Id Software, Inc., Sep. 14, 2007, 53 pages.
Giuseppe Ottaviano et al., "Compressible Motion Fields", 2013 IEEE Conference on Computer Vision and Pattern Recognition, Jun. 23-28, 2013, 8 pages.
Stacy Smith, "Adaptive Scalable Texture Compression." ARM White Paper, Nov. 2013, 12 pages.
Cha Zhang et al., "Compression of lumigraph with multiple reference frame (MRF) prediction and just-in-time rendering." Data Compression Conference, 2000, 12 pages.
Invitation to Pay Additional Fees and, Where Applicable, Protest Fee dated Jan. 15, 2018 for PCT Application No. PCT/US2017/058711, 17 pages.
Marcus Magnor, et al, "Data Compression for Light-Field Rendering," IEEE Transactions on Circuits and Systems for Video Technology, Institute of Electrical and Electronics Engineers, USA, vol. 10, No. 3, Apr. 1, 2000, 6 pages.
Thomas Wiegand, et al., "Long-Term Memory Motion-Compensated Prediction," IEEE Transactions on Circuits and Systems for Video Technology, Institute of Electrical and Electronics Engineers, USA, vol. 9., No. 1, Feb. 1, 1999, 15 pages.
Gustavo Alves, et al., "Light field coding: benchmarking available coding standards," JPEG Meeting, Joint Picture Expert Group, Feb. 26, 2016, 44 pages.
Written Opinion of the International Preliminary Searching Authority dated Jan. 8, 2019 for corresponding International Application No. PCT/US2017/058711, 6 pages.

* cited by examiner

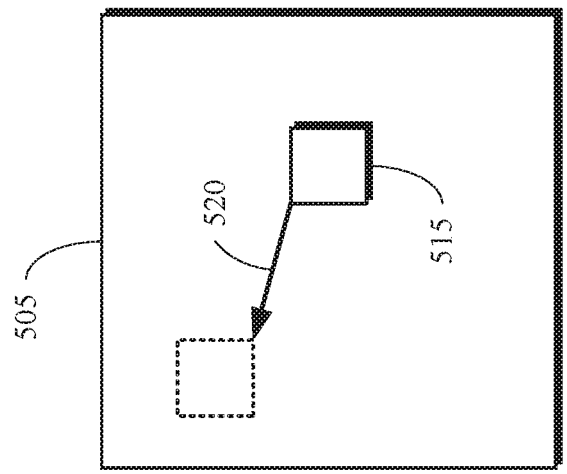
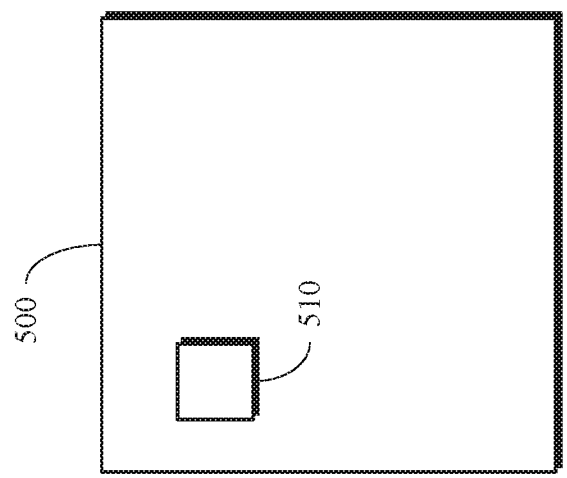
FIG. 5

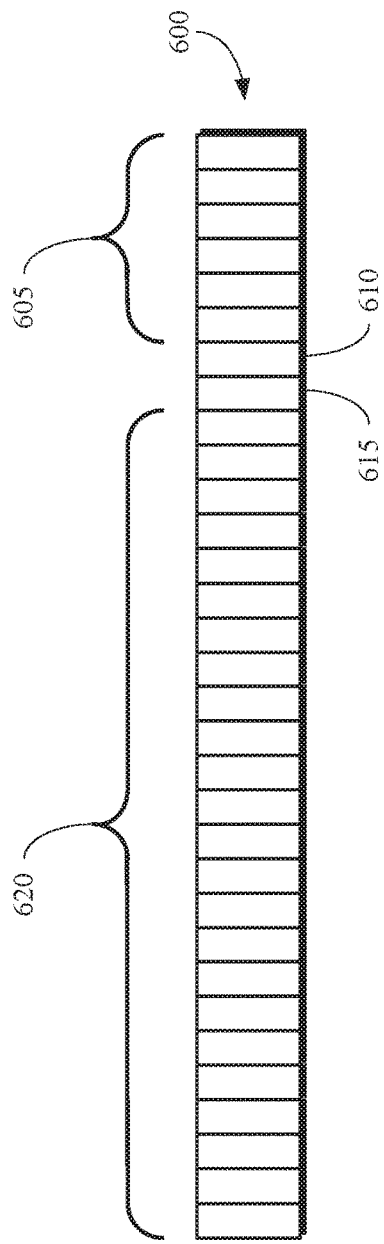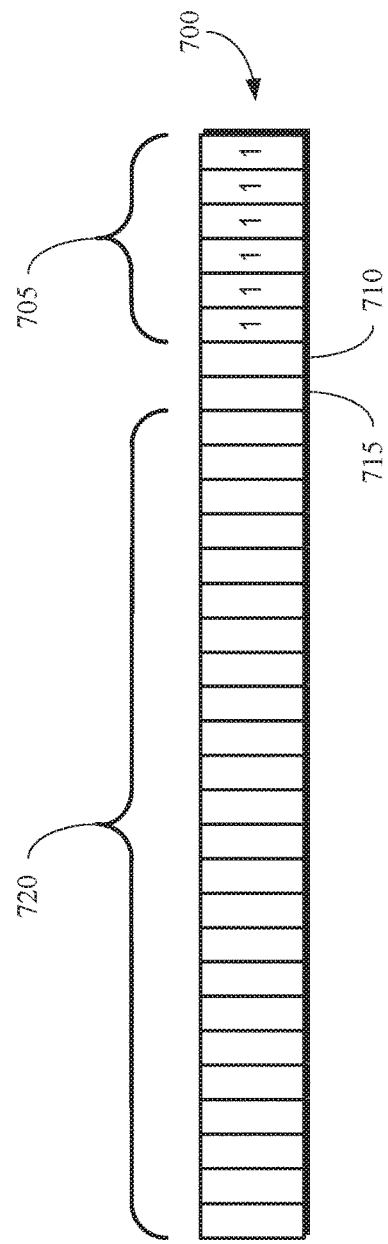

LIGHTFIELD COMPRESSION FOR PER-PIXEL, ON-DEMAND ACCESS BY A GRAPHICS PROCESSING UNIT

BACKGROUND

Lightfield rendering is an alternative to model-based rendering of a scene. In model-based rendering, a three-dimensional (3-D) model of a scene is constructed, e.g., using polygons such as triangles to construct models that represent objects in the scene. Frames are rendered from the point of view of a "camera" by calculating the intensity of light that enters the camera after being reflected, refracted, or radiated by portions of the models. In contrast, lightfield rendering is used to render frames based on a four-dimensional (4-D) function that can be formed of two-dimensional (2-D) images of a portion of a scene. The images represent views of the portions of the scene from different perspectives and frames are rendered from the point of view of the camera by sampling portions of the 2-D images. For example, the coordinates (u, v, s, t) in the 4-D function that represents the lightfield can be defined so that (u, v) determine one of the camera images in the lightfield and (s, t) are coordinates of pixels within the camera image. Other definitions of the four coordinates of the 4-D function that represents the lightfield can also be used. One example of a lightfield rendering technique is disclosed in Levoy and Hanrahan, *Lightfield Rendering, Proc. ACM SIGGRAPH*, 1996, which is incorporated herein by reference in its entirety.

Lightfield rendering may require less processing power than model-based rendering in some cases, but lightfield rendering requires significantly more memory to store the camera images that represent the lightfield. Transmission of uncompressed datasets of the size typically required for lightfields is impractical in current systems. Furthermore, uncompressed lightfield datasets are too large to fit in the memory of almost all real world rendering systems, such as smart phones, tablet computers, or standalone virtual reality head mounted devices (HMDs), which means rendering images from an uncompressed lightfield datasets is impractical. Lightfield datasets therefore generally are compressed for storage and transmission, particularly if the dataset is to be used by devices with fewer storage resources.

Block-based data compression can be used to compress lightfield datasets that are used to render frames in a graphics processing system. For example, a discrete cosine transform (DCT) can be applied to pixels in a 2-D block of pixels to generate frequency components that represent the values of the pixels in the block. Adjacent pixels in images are typically highly correlated and the correlations can be used to predict the value of a pixel from values of neighbor pixels. The DCT transform exploits the interpixel correlation in natural images to reduce information entropy, e.g., by representing the highly correlated spatial pixel data as uncorrelated DCT coefficients. In order to achieve the desired compression ratios for lightfield datasets, variable length codes are used to quantize the DCT coefficients. In addition, the human eye is less sensitive to the higher frequency components, which can therefore be discarded or stored at a lower accuracy than the lower frequency components, thereby further compressing the block. Additional lossless compression, such as Huffman encoding or other entropy coding techniques, can be applied to further compress the information representative of a portion of the image associated with the block. Compressing a digital image (and decompressing the compressed image) according to DCT schemes that utilize variable length codes for quantization does not support random access on a pixel-by-pixel basis because compressing blocks using DCT coefficients that are encoded with variable length codes results in the compressed blocks being stored at unpredictable memory locations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a block diagram illustrating a reference block that is used to calculate residual values for pixels in a block of an image in a lightfield dataset according to some embodiments.

FIG. 6 is a block diagram of a block descriptor that includes information indicating locations of encoded information representative of pixels in a block of an image in a lightfield dataset according to some embodiments.

FIG. 7 is a block diagram of a block descriptor that includes a field to directly indicate colors of pixels in a block of an image in a lightfield dataset according to some embodiments.

DETAILED DESCRIPTION

Figure 1:
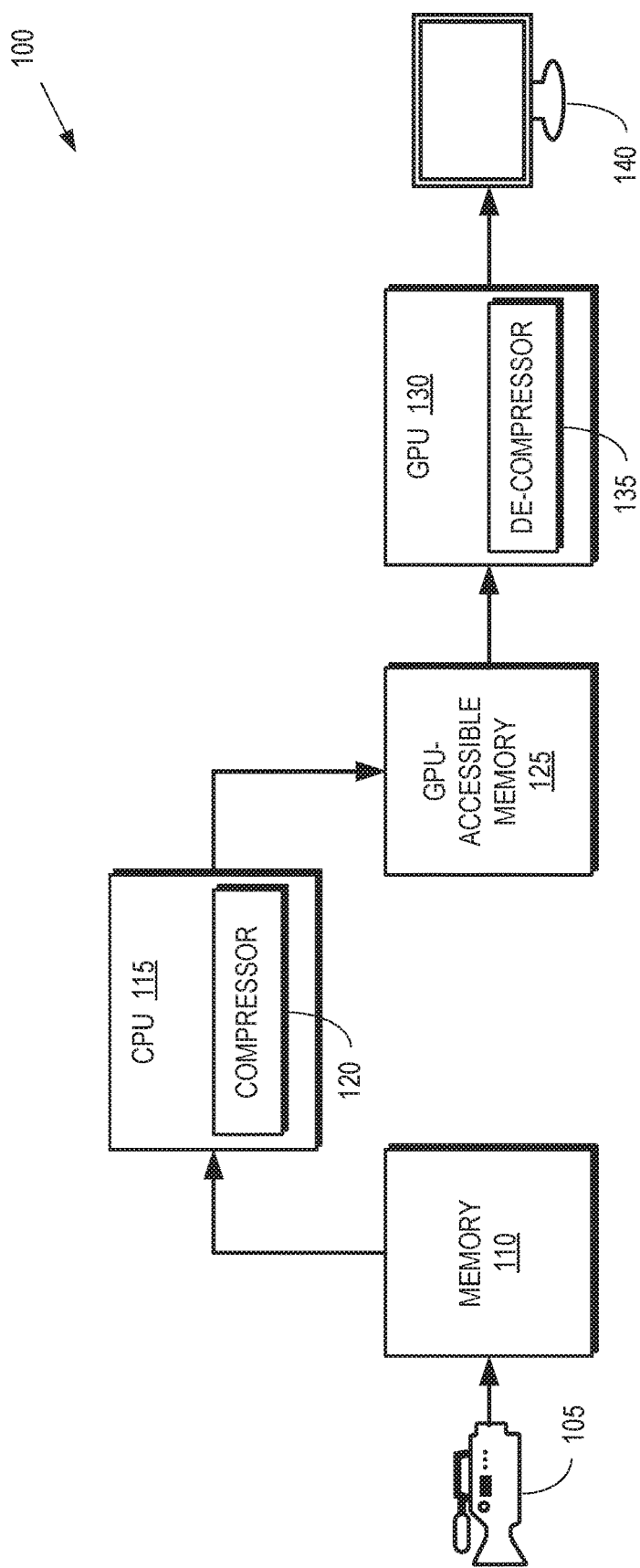
FIG. 1 is a diagram of an image acquisition and display system according to some embodiments.

Performing compression and decompression on a block-by-block basis has a number of consequences for the architecture of a graphics processing system that uses lightfield rendering. Graphics processing units (GPUs) typically implement pipelines that include one or more shaders that operate on pixels and in practice these shaders are not typically able to decompress entire blocks. A central processing unit (CPU) is therefore required to decompress the blocks and store the decompressed data in a memory that is accessible to the GPU. Hardware implemented in the GPU can then access the uncompressed data from a GPU-accessible memory and decode the uncompressed lightfield data according to a supported texture compression scheme. Complex page table/tile-based schemes can be used to provide decompressed lightfield data to the GPU-accessible memory on demand. Although the CPU is able to submit work to the GPU, the readback latencies between submitting the work to the GPU and seeing the results of the work at the CPU are high. Furthermore, reading back results from the GPU often requires flushing the GPU pipeline, which can result in the GPU pipeline being idle for a period of time. Consequently, operations such as tile uploads and visibility calculations are often performed by the CPU. Furthermore, supplying compressed textures for access by the GPU is difficult because converting DCT encoded data or uncompressed data to compressed textures is computationally expensive.

Lightfield datasets can be compressed at high compression ratios in a format that supports random access on a pixel-by-pixel basis by applying texture compression techniques to the lightfield dataset and constructing a block descriptor that identifies locations of pixels in the compressed data. In some embodiments, image data for a block of pixels from the lightfield dataset is encoded at one of a plurality of bit rates and the encoded image data for the block is associated with one of a plurality of buckets corresponding to the bit rate used to encode the block. A block descriptor for the block includes a first field to store information that indicates whether values of the pixels in the block are (a) represented by information stored in a second field of the block descriptor or (b) pointed to by information stored in the second field of the block descriptor. If the pixels in the block are represented by a single color, the first field includes a reserved value (e.g., all the bits in the first field are set to a value of one) and the second field stores information representing the color. If the pixels in the block are not represented by single color, the first field includes information that indicates a base address (or starting point) of a bucket that holds the block. The second field stores a block index that indicates a location of the encoded image data for the pixels in the block. The image data represents a value of the pixel or a residual value for the pixel that is combined with a reference value of a reference pixel to generate the value of the pixel. If the image data is a residual value, the compressed lightfield dataset also includes one or more motion vectors that associate the pixels in the block with reference pixels in a reference image. In some embodiments of the variable bit rate encoding technique disclosed herein, which can include additional entropy coding of the variable bit rate encoded information, the compressed lightfield dataset is compressed by a ratio of 1000 or more relative to the uncompressed lightfield dataset.

The compressed lightfield dataset including the compressed image data and the block descriptors is stored in a GPU-accessible memory. As used herein, the term "GPU-accessible memory" refers to a physical memory element or a portion of a physical memory element that is allocated to the GPU and used to store information in a format that is directly accessible by the GPU, e.g., for performing shading or rendering operations. The GPU can access compressed information from the GPU-accessible memory on a pixel-by-pixel basis. For example, ray tracing can be used to identify a pixel in a block of a compressed lightfield dataset stored in the GPU accessible memory. The GPU can then access the compressed image data for the pixel using the information in the block descriptor of the block that includes the pixel. The GPU decodes the encoded image data for the pixel using the information in the block descriptor. For example, if a first field in the block descriptor has a special value that indicates that the pixels in the block have a single color, the GPU retrieves the value of the single color from a second field of the block descriptor. For another example, if the first field in the block descriptor includes a bucket index that identifies a bucket that holds the encoded image data for the block, the GPU identifies a starting location of the encoded image data for the block using a block index stored in the second field. The GPU can then use the coordinates of the pixel to retrieve the encoded image data for the pixel, which is then decompressed by the GPU. If the encoded image data is a residual value of the pixel, the GPU combines the residual value with a reference value based on a motion vector associated with the block/pixel. Otherwise, the encoded image data represents the value of the pixel. Thus, the GPU can decompress the compressed lightfield data on a pixel-by-pixel basis from GPU-accessible memory.

FIG. 1 is a diagram of an image acquisition and display system 100 according to some embodiments. The image acquisition and display system 100 includes an image acquisition device 105 that is used to acquire two-dimensional (2-D) images of a scene from a plurality of different viewpoints. The 2-D images can be acquired by an image acquisition device 105, which comprises either or both of a physical image acquisition device, such as a camera, that acquires images of an actual scene from the different viewpoints, or a virtual image acquisition device 105 that generates images of a virtual scene such as a scene represented by a three-dimensional (3-D) model). The 2-D images are used to define a four dimensional (4-D) function that represents the scene as viewed from the different viewpoints. The 4-D function is referred to as a lightfield, as discussed herein. Frames can be rendered for display from an arbitrary point of view by sampling portions of the 2-D images. For example, the coordinates (u, v, s, t) in the 4-D function that represents the lightfield can be defined so that (u, v) determine one of the 2-D images in the lightfield and (s, t) are coordinates of pixels within the 2-D image. The lightfield dataset produced by the image acquisition device 105 is stored in a memory 110.

A processing unit such as a central processing unit (CPU) 115 is configured to access the lightfield dataset stored in the memory 110. The CPU 115 includes a compressor 120, which can be implemented in hardware, firmware, software, or a combination thereof. Some embodiments of the compressor 120 encode information that represents values of pixels in blocks of images in the lightfield dataset using variable bit rate encoding. For example, the compressor 120 can compress the lightfield dataset by encoding the values of pixels in a first block of an image at a first bit rate that is selected from a plurality of bit rates and the values of pixels in a second block of the image can be encoded at a second bit rate that differs from the first bit rate. The CPU 115 also generates a block descriptor for each compressed block of pixels that includes information indicating locations of the encoded information for each pixel in a memory 125 that is accessible to a second processing unit such as the GPU 130 on a pixel-by-pixel basis. The CPU 115 then stores the block descriptor and the encoded information in the GPU-accessible memory 125.

The GPU 130 is configured to access the encoded information that represents values of the pixels on a pixel-by-pixel basis using information in the block descriptor. For example, in order to access encoded information that represents a value of an individual pixel in a block of an image, the GPU 130 can access a block descriptor that includes information indicating locations (in the GPU-accessible memory 125) of encoded information representative of values of pixels in the block of the image. The GPU 130 can then retrieve the encoded information from the GPU-accessible memory 125 and decode the encoded information to determine a value of the pixel. Some embodiments of the GPU 130 include a decompressor 135 that is configured to decompress the encoded information, as discussed herein. The GPU 130 can then render the value of the pixel for presentation on a display 140. Motion compensation techniques can also be used, in which case motion vectors relative to a reference image are used to define residual values of the pixels. The residual values are then encoded/decoded as discussed herein.

Figure 2:
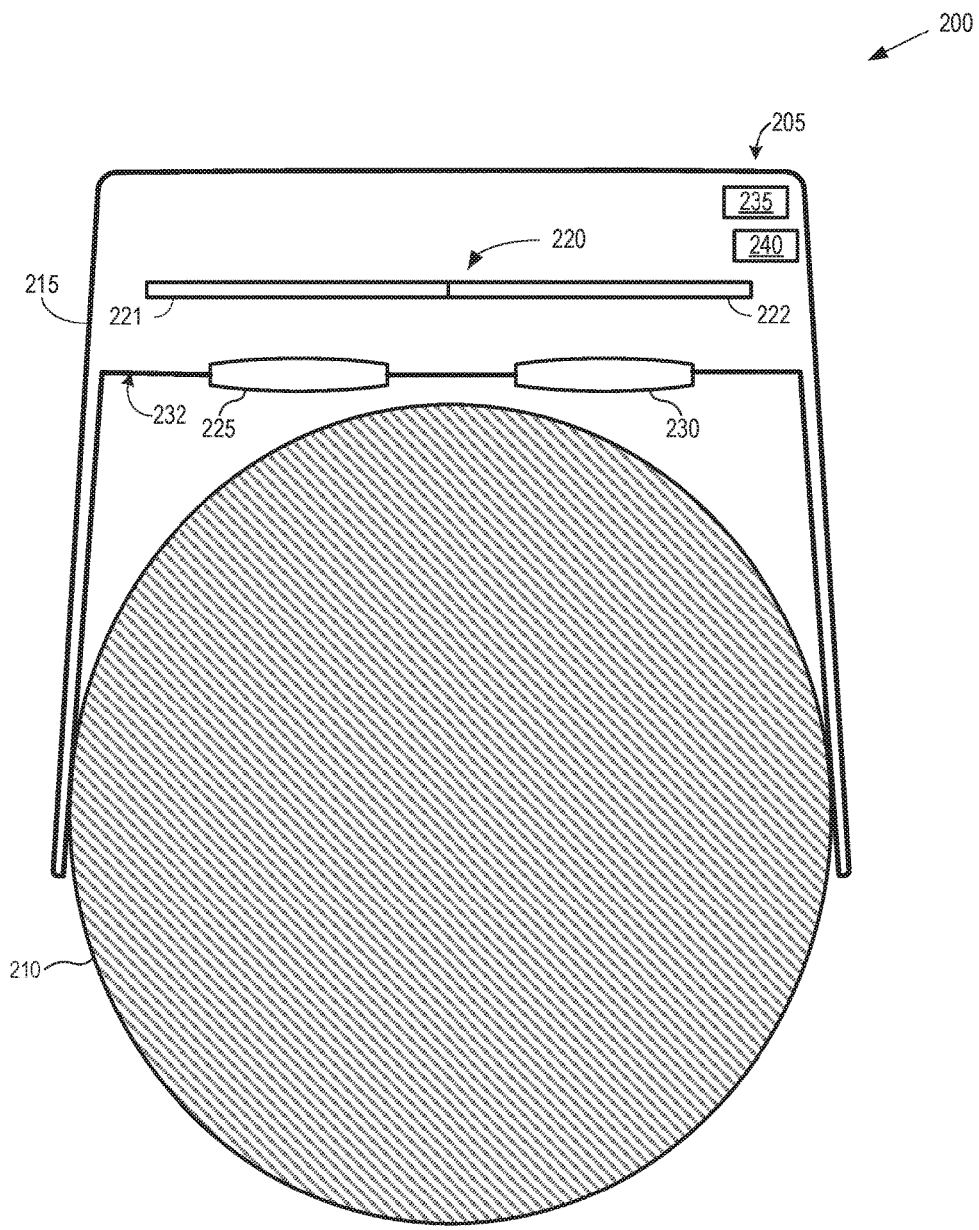
FIG. 2 illustrates a display system that includes an electronic device configured to provide augmented reality (AR) or virtual reality (VR) functionality via a display according to some embodiments.

FIG. 2 illustrates a display system 200 that includes an electronic device 205 configured to provide augmented reality (AR) or virtual reality (VR) functionality via a display according to some embodiments. The illustrated embodiment of the electronic device 205 can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device 205 can include a fixture device, such as medical imaging equipment, a security imaging sensor system, an industrial robot control system, a drone control system, and the like. For ease of illustration, the electronic device 205 is generally described herein in the example context of an HMD system; however, the electronic device 205 is not limited to these example implementations.

The electronic device 205 is shown in FIG. 2 as being mounted on a head 210 of a user. As illustrated, the electronic device 205 includes a housing 215 that includes a display 220 that generates an image for presentation to the user. The display 220 is implemented using some embodiments of the display 140 shown in FIG. 1. In the illustrated embodiment, the display 220 is formed of a left display 221 and a right display 222 that are used to display stereoscopic images to corresponding left eye and right eye. However, in other embodiments, the display 220 is a single monolithic display 220 that generates separate stereoscopic images for display to the left and right eyes. The electronic device 205 also includes eyepiece lenses 225 and 230 disposed in corresponding apertures or other openings in a user-facing surface 232 of the housing 215. The display 220 is disposed distal to the eyepiece lenses 225 and 230 within the housing 215. The eyepiece lens 225 is aligned with the left eye display 221 and the eyepiece lens 230 is aligned with the right eye display 222.

In a stereoscopic display mode, imagery is displayed by the left eye display 221 and viewed by the user's left eye via the eyepiece lens 225. Imagery is concurrently displayed by the right eye display 222 and viewed by the user's right eye via the eyepiece lens 225. The imagery viewed by the left and right eyes is configured to create a stereoscopic view for the user. Some embodiments of the displays 220, 221, 222 are fabricated to include a bezel (not shown in FIG. 2) that encompasses an outer edges of the displays 220, 221, 222. In that case, the lenses 225, 230 or other optical devices are used to combine the images produced by the displays 220, 221, 222 so that bezels around the displays 220, 221, 222 are not seen by the user. Instead, lenses 225, 230 merge the images to appear continuous across boundaries between the displays 220, 221, 222.

In some embodiments, some or all of the electronic components that control and support the operation of the display 220 and other components of the electronic device 205 are implemented within the housing 215. For example, the electronic device 205 can include a GPU 235 and GPU-accessible memory 240. The GPU 235 is implemented using some embodiments of the GPU 130 shown in FIG. 1 and the GPU-accessible memory 240 is implemented using some embodiments of the GPU-accessible memory 125 shown in FIG. 1. A compressed lightfield dataset can be stored in the GPU-accessible memory 125. In some embodiments, an external processing unit (not shown in FIG. 2) compresses the lightfield dataset using a variable bit rate encoding scheme, as discussed herein, and then provides the compressed lightfield dataset to the electronic device 205 for storage in the GPU-accessible memory 240. The GPU 235 is configured to access encoded information in the compressed lightfield dataset on a pixel-by-pixel basis using information in a block descriptor, as discussed herein. The GPU 235 can then decode the encoded information and use the decoded information to render the pixel for presentation on one or more of the displays 220, 221, 222.

Figure 3:
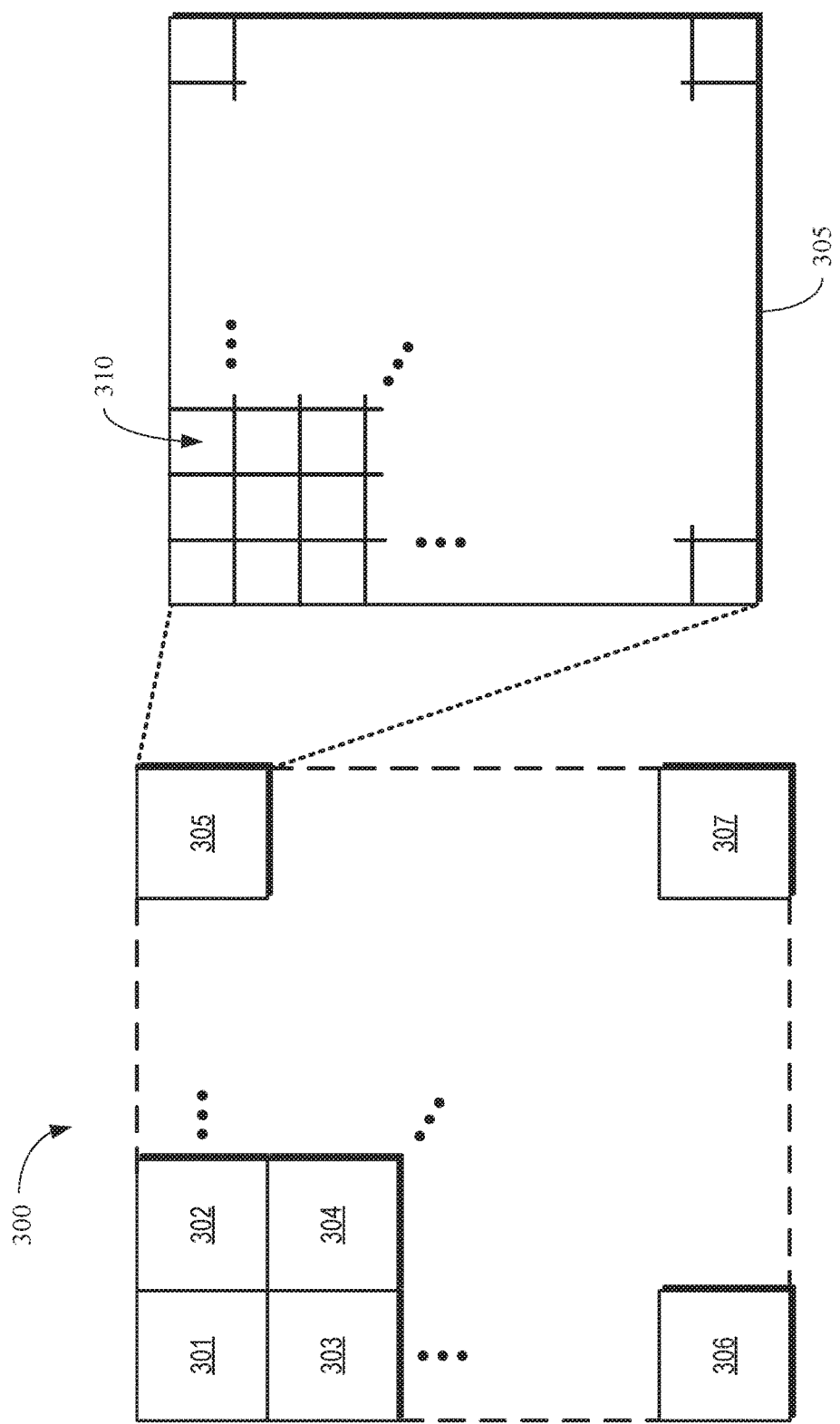
FIG. 3 is a block diagram that illustrates an uncompressed lightfield dataset according to some embodiments.

FIG. 3 is a block diagram that illustrates an uncompressed lightfield dataset 300 according to some embodiments. The uncompressed lightfield dataset 300 can be acquired using a camera such as the image acquisition device 105 shown in FIG. 1 and then stored in a memory such as the memory 110 shown in FIG. 1. The uncompressed lightfield dataset 300 includes a plurality of images 301, 302, 303, 304, 305, 306, 307, which are collectively referred to herein as "the images 301-307." Some embodiments of the images 301-307 in the uncompressed lightfield dataset 300 are images of a particular object or portion of a scene that are acquired by a camera at different positions and orientations. Each of the images 301-307 is represented as values of a 2-D array of pixels. For example, each image 301-307 can include values of a 1024×1024 array of pixels. To represent a color image, the values of the pixels are represented by color component values representative of intensities of different colors, such as red, green, and blue. As discussed herein, The images 301-307 are subdivided into sets of blocks. For example, the image 305 is subdivided into a set of 2-D blocks 310 (only one indicated by a reference numeral in the interest of clarity). Each of the 2-D blocks 310 includes the same number of pixels. For example, each 2-D block 310 can include values of a 32×32 array of pixels. In that case, the image 305 includes a 32×32 array of blocks. The values (or residual values, if motion compensation is used) of the pixels in the 2-D block 310 can be compressed using variable bit rate encoding schemes and, in some cases, additional entropy coding to further reduce the size of the compressed lightfield dataset. The encoded information representative of values of individual pixels in the compressed lightfield dataset can be accessed on a pixel-by-pixel basis using block descriptors associated with the 2-D blocks 310.

Figure 4:
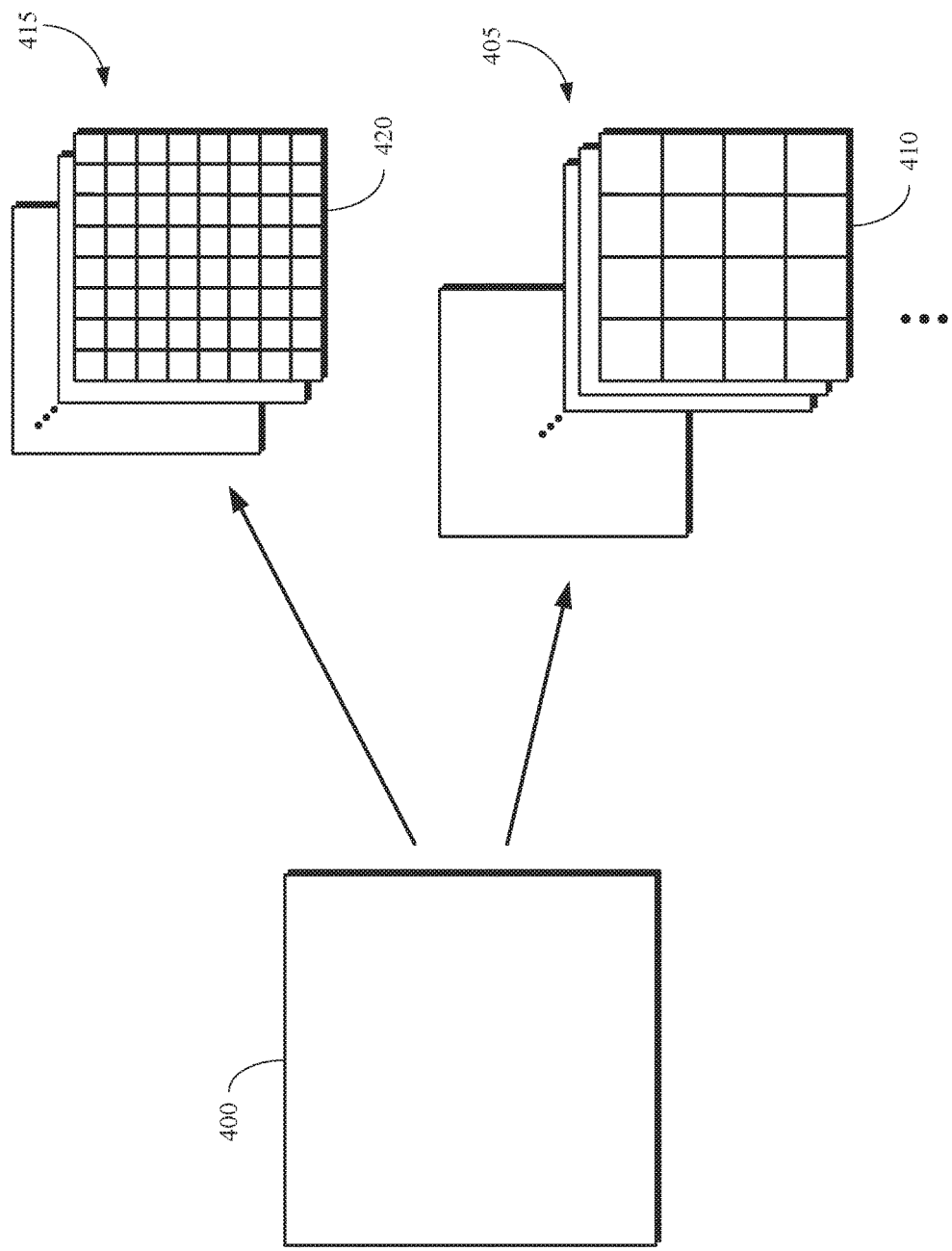
FIG. 4 is a block diagram illustrating variable bit rate encoding of a block of pixels from an image in a lightfield dataset according to some embodiments.

FIG. 4 is a block diagram illustrating variable bit rate encoding of a block 400 of pixels from an image in a lightfield dataset according to some embodiments. The block 400 represents some embodiments of the 2-D block 310 shown in FIG. 3. A processing unit such as the CPU 115 shown in FIG. 1 is configured to select a bit rate from a set of bit rates that are available to encode the values (or residual values) of the pixels in the block 400. In some embodiments, the set of bit rates indicate a range of numbers of bits that are used to encode the value of each pixel in the block 400. One example of a variable bit rate encoding scheme is adaptive scalable texture compression (ASTC)

such as the ASTC scheme described by Nystad, et al. ("Adaptive Scalable Texture Compression," High Performance Graphics, 2012), which is incorporated herein by reference in its entirety. However, other embodiments can implement other variable bit rate encoding schemes such as Ericsson Texture Compression (ETC).

In the ASTC scheme, the 2-D block 400 is further subdivided into sub blocks that have different sizes. Each sub block is represented by the same number of bits, e.g., 128 bits per sub block. Thus, the number of bits per pixel is equal to the number of pixels in the sub block divided by the number of bits per sub block. For example, the pixels in a 4×4 sub block are represented by eight bits per pixel and the pixels in a 12×12 sub block are represented by 0.89 bits per pixel. In the illustrated embodiment, the 2-D block 400 can be represented by a set 405 of 4×4 sub blocks 410 (only one indicated by a reference numeral in the interest of clarity), a set 415 of 8×8 sub blocks 420 (only one indicated by a reference numeral in the interest of clarity), or using sub blocks of different dimensions. The number of sub blocks in the set used to represent the 2-D block 400 increases as the number of bits used to represent each pixel increases. For example, the number of sub blocks 410 in the set 405 is four times the number of sub blocks 420 in the set 415.

In some embodiments, the values of the pixels in the 2-D block 400 are directly encoded according to the variable bit rate encoding scheme. However, in other cases, one or more reference images are chosen from among the images in the lightfield dataset and one or more motion vectors are calculated relative to the reference images for the images in the lightfield dataset. Residual values of the pixels in the blocks of the images are determined by subtracting reference values of reference pixels indicated in the reference images by the motion vectors. The residual values of the pixels in the 2-D block 400 are then encoded according to the variable bit rate encoding scheme.

FIG. 5 is a block diagram illustrating a reference block 500 that is used to calculate residual values for pixels in a block 505 of an image in a lightfield dataset according to some embodiments. The block 505 represents some embodiments of the block 310 shown in FIG. 3 or the block 400 shown in FIG. 4. The reference block 500 includes a reference pixel 510 that represents a portion of a reference image, which can be selected from the images in the lightfield dataset. The block 505 includes a pixel 515 that is associated with the reference pixel 510 by a motion vector 520. A residual value for the pixel 515 can then be calculated by subtracting the value of the reference pixel 510 from the value of the pixel 515. The value of the pixel 515 can be reconstructed by identifying the reference pixel 510 in the reference block 500 based on the motion vector 520 and adding it to the residual value of the pixel 515.

The motion vector 520 is determined by comparing values of the pixels in the reference block 500 to values of the pixels in the block 505. For example, a value of the motion vector 520 can be selected from a set of motion vectors using a brute force method that calculates residual values for the pixels in the block 500 using the pixels in the reference block 500 indicated by each motion vector in the set. The residual values are encoded (in some cases using each available bit rate) to generate a compressed representation of the block 500 for each combination of motion vector and encoding bit rate. The compressed representations are then decoded and compared to the original values of the pixels in the block 500 to determine the encoding errors associated with each combination of encoding bit rate and motion vector. The value of the motion vector is then selected based on the encoding costs and the magnitude of the errors for each of the set of motion vectors. In the illustrated embodiment, a single motion vector 520 is selected for the block 505. However, multiple motion vectors can be determined for the block 505 in other embodiments.

FIG. 6 is a block diagram of a block descriptor 600 that includes information indicating locations of encoded information representative of pixels in a block of an image in a lightfield dataset according to some embodiments. The block descriptor 600 is associated with some embodiments of the block 310 shown in FIG. 3, the block 400 shown in FIG. 4, or the block 505 shown in FIG. 5. The block descriptor 600 includes a first field 605 of bits that represent a bucket index, which can be used to indicate a starting location of a bucket that holds compressed representations of pixels in blocks that were encoded according to a corresponding bit rate. For example, the bucket index can be represented by values of six bits in the first field 605. The block descriptor 600 includes a second field 610 that indicates whether the encoded information representative of pixels in the corresponding block includes encoded values of the pixels ("intra") or encoded residual values of the pixels ("inter"). For example, a value of a bit in the second field 610 can indicate whether the encoded information is intra block information or inter block information. The block descriptor 600 includes a third field 615 that is unused. The block descriptor 600 also includes a fourth field 620 that can include information that points to a starting location of an encoded block in the bucket indicated by the bucket index in the first field 605. The fourth field 620 can also include information that directly indicates colors of the pixels in the block. For example, the fourth field 620 can include the information that points to the starting location of the encoded block unless the value of the bits in the first field 605 is equal to a reserved value. In that case, the fourth field 620 includes information that directly indicates the colors of the pixels in the block, such as an RGB color value, parameters of a color ramp, and the like.

FIG. 7 is a block diagram of a block descriptor 700 that includes a field to directly indicate colors of pixels in a block of an image in a lightfield dataset according to some embodiments. The block descriptor 700 is associated with some embodiments of the block 310 shown in FIG. 3, the block 400 shown in FIG. 4, or the block 505 shown in FIG. 5. The block descriptor 700 includes a first field 705, a second field 710, a third field 715, and a fourth field 720 that correspond to the fields 605, 610, 615, 620 shown in FIG. 6. However, the values of the bits in the first field 605 are set to a reserved value of 111111 to indicate that the fourth field 720 includes information that directly indicates values of the pixels in the block corresponding to the block descriptor 700. The information stored in the fourth field 720 can be values of bits that indicate an RGB color value of all of the pixels in the block, parameters of a color ramp that indicate values of the pixels in the block, and the like. Since the color information is stored in the fourth field 720, encoded information representative of values of the pixels in the block do not need to be stored at any other location, thereby further compressing the size of the lightfield dataset.

Figure 8:
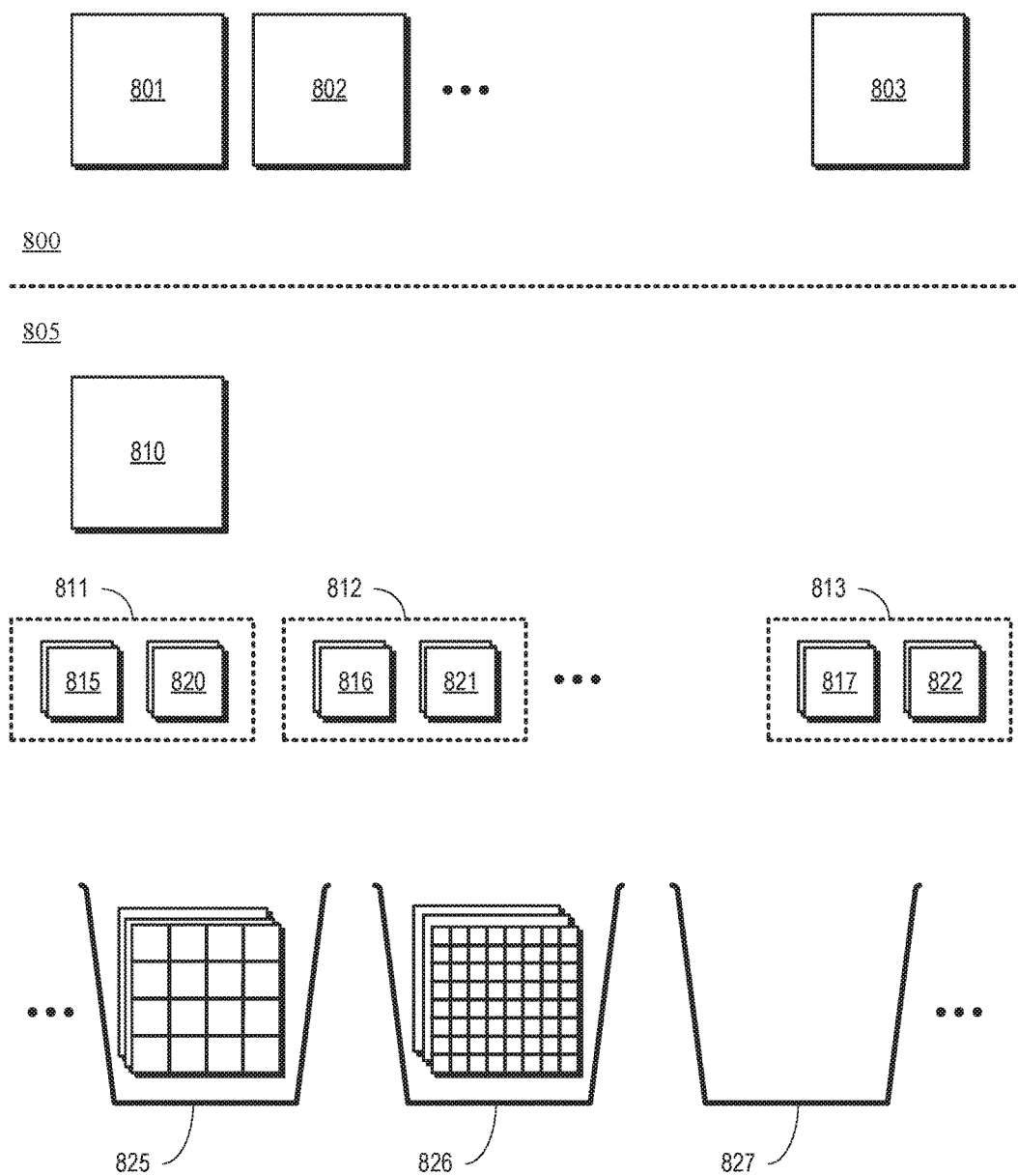
FIG. 8 is a block diagram illustrating images in a lightfield dataset and encoded information that supports accessing portions of the encoded information that represent values of pixels in the lightfield dataset on a pixel-by-pixel basis according to some embodiments.

FIG. 8 is a block diagram illustrating images in a lightfield dataset 800 and encoded information 805 that supports accessing portions of the encoded information 805 that represent values of pixels in the lightfield dataset on a pixel-by-pixel basis according to some embodiments. The lightfield dataset 800 can be acquired by some embodiments of the image acquisition device 105 and stored in the memory 110 shown in FIG. 1. The encoded information 805 is generated by some embodiments of the CPU 115 and stored in the GPU-accessible memory 125 shown in FIG. 1. Some embodiments of the GPU 130 shown in FIG. 1 can access portions of the encoded information 805 that represent individual pixels on a pixel by pixel basis from the GPU-accessible memory 125 shown in FIG. 1.

The lightfield dataset 800 includes images 801, 802, 803, which are collectively referred to herein as "the images 801-803." The images 801-803 represent some embodiments of the images 301-307 shown in FIG. 3. For example, each of the images 801-803 can include values of a 1024× 1024 array of pixels. As discussed herein, the images 801-803 are subdivided into blocks of pixels. For example, the images 801-803 can be subdivided into 32×32 arrays of blocks, which each include values of a 32×32 array of pixels.

In the illustrated embodiment, the encoded information 805 includes a reference image 810 that is used to determine motion vectors and residual values of pixels in blocks of the images 801-803, as discussed herein. For example, one of the images 801-803 can be selected as the reference image 810. Motion vectors and residual values of pixels in the blocks of the images 801-803 can then be determined relative to the selected reference image 810. However, as discussed herein, motion vectors and residual values are not necessarily determined for every block in every image 801-803. Blocks that are encoded using motion vectors and residual values are referred to herein as "inter" blocks and blocks that are not encoded using motion vectors and residual values, i.e., the values of the pixels in the blocks are encoded using variable bit rate encoding, are referred to herein as "intra" blocks.

The images 801-803 in the lightfield dataset 800 are associated with corresponding block-level information 811, 812, 813, which is collectively referred to herein as "the block-level information 811-813." The block level information 811-813 includes block descriptors 815, 816, 817 (collectively referred to herein as "the block descriptors 815-817") associated with the blocks of pixels in the corresponding images 801-803. The block descriptors 815-817 are implemented using some embodiments of the block descriptor 600 shown in FIG. 6 or the block descriptor 700 shown in FIG. 7. The block-level information 811-813 can also include motion vectors 820, 821, 822 (collectively referred to herein as "the motion vectors 820-822") that are used to associate pixels in the blocks of the images 801-803 with pixels in blocks of the reference image 810. As discussed herein, not every block in the images 801-803 is necessarily associated with a motion vector 820-822.

The encoded residual values of pixels in the blocks of the images 801-803 (if motion compensation is used) or the encoded values of the pixels in the blocks of the images 801-803 (if motion compensation is not used) are stored in buckets 825, 826, 827, which are collectively referred to herein as "the buckets 825-827." The buckets 825-827 hold information that is encoded at different bit rates. For example, the bucket 825 holds information that is encoded at eight bits per pixel, the bucket 826 holds information that is encoded at two bits per pixel, and the bucket 827 holds information that is encoded at one bit per pixel. Additional buckets (not shown in FIG. 8) are used to hold information that is encoded at other bit rates. As discussed herein, the block descriptors 815-817 include fields that can store a bucket index to a starting location of a bucket that holds compressed representations of the pixels in the corresponding blocks. The block descriptors 815-817 also include fields that can store information that points to a starting location of the corresponding encoded block in the bucket indicated by the bucket index.

Figure 9:
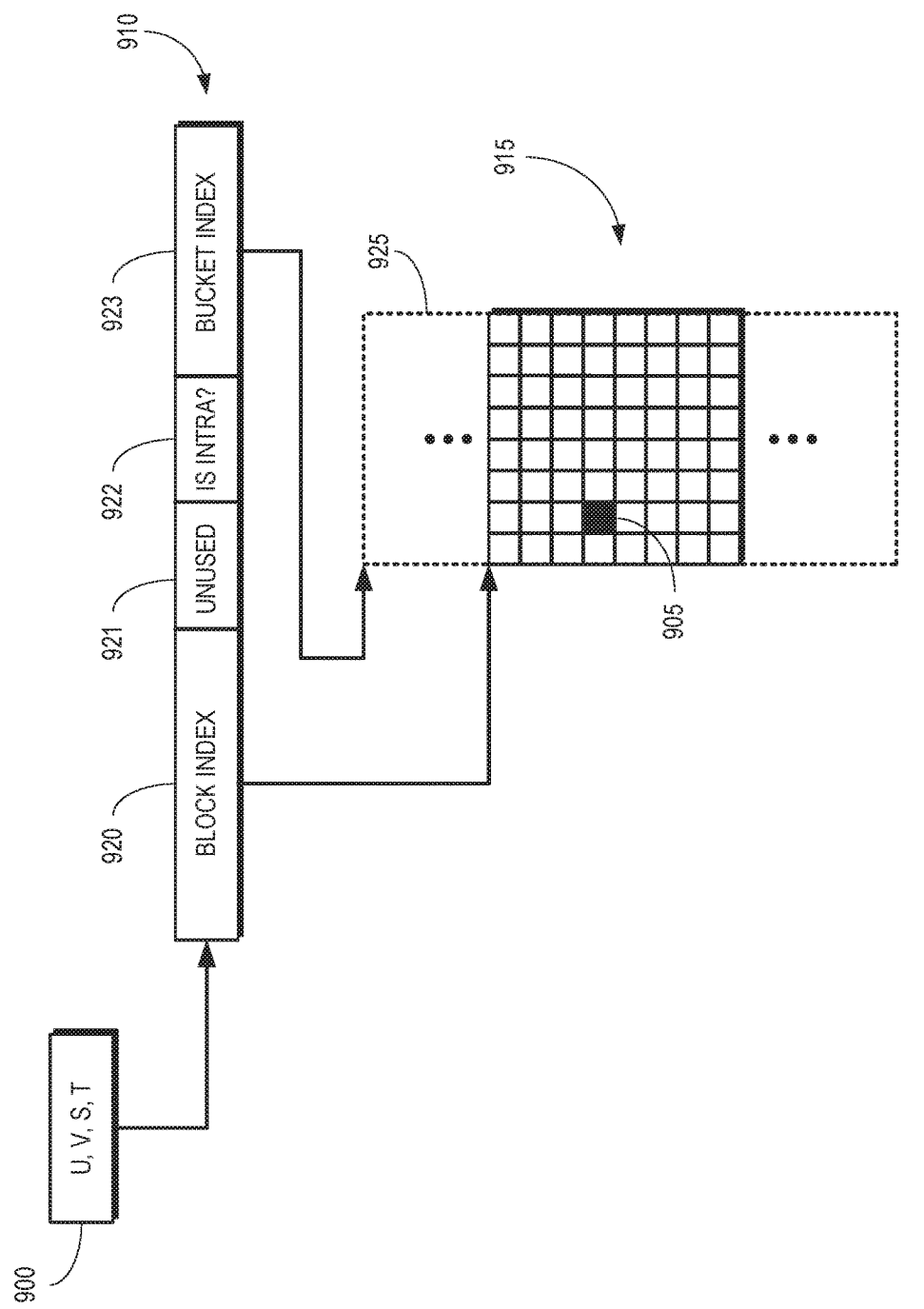
FIG. 9 is a block diagram illustrating pixel-by-pixel access to encoded information representative of pixels in a block of an image in a lightfield dataset according to some embodiments.

FIG. 9 is a block diagram illustrating pixel-by-pixel access to encoded information representative of pixels in a block of an image in a lightfield dataset according to some embodiments. In the illustrated embodiment, individual pixels in the lightfield dataset are identified by four coordinates (u, v, s, t). For example, an access request 900 for the encoded information representative of a pixel 905 (indicated by a solid square) can be generated that includes information indicating the four coordinates (u, v, s, t) of the pixel 905. The access request 900 is generated by a processing unit such as the GPU 130 shown in FIG. 1, e.g., in response to the processing unit determining that the pixel 905 is to be rendered for presentation on a display such as the display 140 shown in FIG. 1. As discussed herein, the encoded information can represent a value of the pixel 905 or a residual value of the pixel 905.

The four coordinates (u, v, s, t) of the pixel 905 indicated in the access request 900 are used to identify a block descriptor 910 for a block 915 that includes the pixel 905. In some embodiments, the coordinates (u, v) identify an image in the lightfield dataset and the coordinates (s, t) identify the location of the pixel 905 in the block 915 of the image. The block descriptor 910 can therefore be identified using the coordinates (u, v) to identify the image and using a set of most significant bits of the coordinates (s, t) to identify a starting location of the block 915. For example, if each block is a 32×32 array of pixels the values of the coordinates (s, t) modulo 32 provides the coordinates of the starting point of the block 915 that includes the pixel 905. Once the block 915 that includes the pixel 905 has been identified, the corresponding block descriptor 910 can be identified. For example, the pixel at the coordinates (2, 3) is located in the block that begins at the coordinate (0, 0) and is therefore associated with the block descriptor for the block that begins at the coordinates (0, 0). The pixel at the coordinates (35, 37) is in the block that begins at the coordinate (32, 32) and is therefore associated with the block descriptor for the block that begins at the coordinates (32, 32).

The block descriptor 910 includes a block index field 920, an unused field 921, an "is intra?" field 922, and a bucket index field 923. The block descriptor 910 is therefore implemented using some embodiments of the block descriptor 600 shown in FIG. 6. The value of the bucket index field 923 is used to point to a starting location of a bucket 925 that holds information that is encoded at a bit rate associated with the bucket 925. For example, the bucket 925 can hold information that is encoded at eight bits per pixel. The value of the block index field 920 points to a starting location of the block 915 and the bucket 925. The individual pixel 905 can then be accessed from the block 915 on the basis of the coordinates (s, t).

Figure 10:
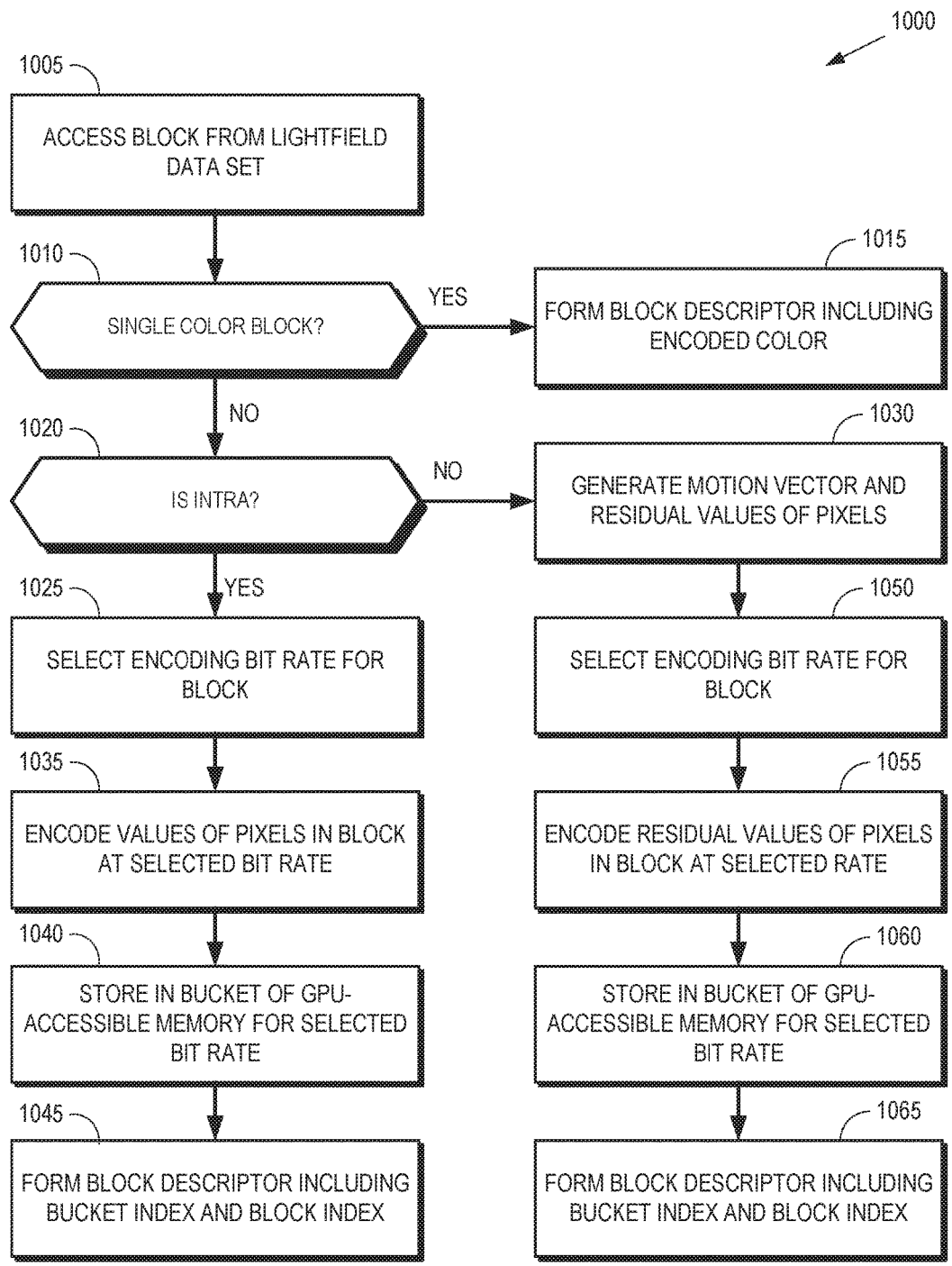
FIG. 10 is a flow diagram of a method for encoding values (or residual values) of pixels in a block of an image of the lightfield dataset so that the encoded information can be accessed on a pixel-by-pixel basis according to some embodiments.

FIG. 10 is a flow diagram of a method 1000 for encoding values (or residual values) of pixels in a block of an image of the lightfield dataset so that the encoded information can be accessed on a pixel-by-pixel basis according to some embodiments. The method 1000 is implemented in some embodiments of a processing unit such as the CPU 115 shown in FIG. 1.

At block 1005, the processing unit accesses a block of pixels from the lightfield dataset. As discussed herein, an image acquisition device such as the image acquisition device 105 shown in FIG. 1 can generate one or more images and store blocks of pixels in the images in a memory. The processing unit can access the block of pixels by reading the block of pixels from the memory.

At decision block 1010, the processing unit determines whether the values of the pixels in the block can be represented by a single color. If so, the processing unit forms (at block 1015) a block descriptor that includes an encoded value of the color that is applied to the pixels in the block. For example, a bucket index field in the block descriptor can be set to a special value that indicates that the encoded value of the color is stored in a block index field of the block descriptor. The processing unit can then set the value of the block index field equal to the encoded value of the color. In some embodiments, the processing unit can also determine whether the values of the pixels in the block can be represented by a limited range of colors, such as a range of colors that can be represented by a color ramp. In that case, the processing unit sets the value of the bucket index field to a special value and sets the value of the block index field equal to parameters of the color ramp. If the processing unit determines that the pixels cannot be represented by single color (or a color ramp or other parameterization), the method 1000 flows to decision block 1020.

At decision block 1020, the processing unit determines whether the block associated with the block descriptor is an intra block (i.e., the values of the pixels in the block are encoded at a selected rate) or an inter block (i.e., the residual values of the pixels in the block are encoded at the selected rate). If the block is an intra block, the method 1000 flows to block 1025. If the block is an inter block, the method 1000 flows to block 1030.

At block 1025, the processing unit selects an encoding bit rate that is used to encode the values of the pixels in the intra block. The encoding bit rate is selected from a plurality of bit rates that are available to use for encoding the values of the pixels. At block 1035, the values of the pixels in the intra block are encoded at the selected bit rate. At block 1040, the encoded values are stored in a bucket for the selected bit rate. The bucket is located in memory that is accessible to another processing unit, e.g., the memory is a GPU-accessible memory. At block 1045, the processing unit forms a block descriptor including a bucket index that indicates the bucket for the selected bit rate and a block index that indicates a starting point of the intra block in the bucket.

At block 1030, the processing unit generates one or more motion vectors for the inter block and residual values for the pixels in the inter block. For example, the processing unit can generate the motion vectors and residual values using the brute force method described herein. The motion vectors and the associated reference image are stored in the GPU-accessible memory. At block 1050, the processing unit selects an encoding bit rate that is used to encode the residual values of the pixels in the inter block. The encoding bit rate is selected from a plurality of bit rates that are available to use for encoding the residual values of the pixels. At block 1055, the residual values of the pixels in the inter block are encoded at the selected bit rate. At block 1060, the encoded residual values are stored in a bucket for the selected bit rate. The bucket is located in memory that is accessible to another processing unit, e.g., the memory is a GPU-accessible memory. At block 1065, the processing unit forms a block descriptor including a bucket index that indicates the bucket for the selected bit rate and a block index that indicates a starting point of the inter block in the bucket.

Figure 11:
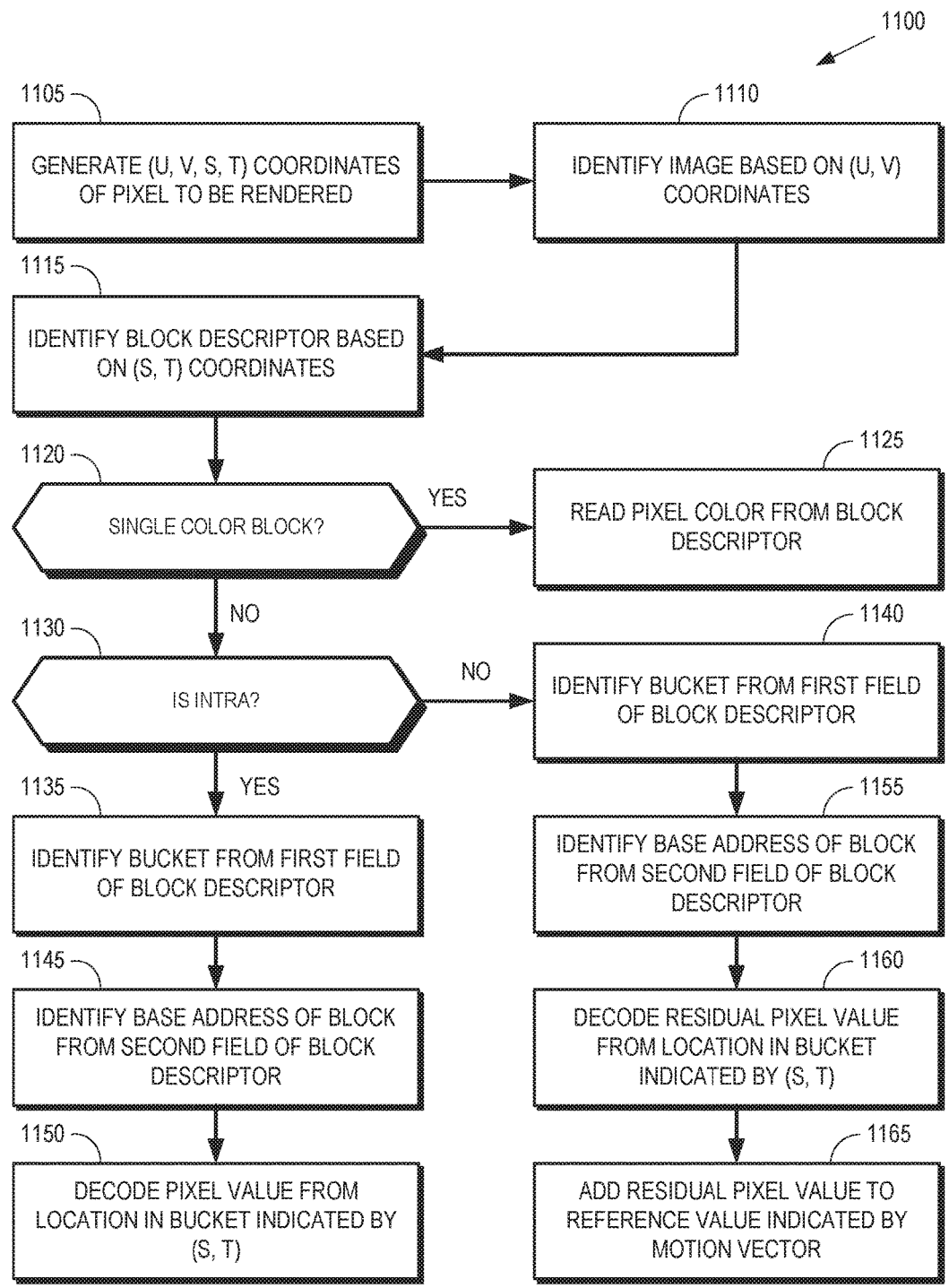
FIG. 11 is a flow diagram of a method for decoding values (or residual values) of pixels in a block of an image of the lightfield dataset on a pixel-by-pixel basis according to some embodiments.

FIG. 11 is a flow diagram of a method 1100 for decoding values (or residual values) of pixels in a block of an image of the lightfield dataset on a pixel-by-pixel basis according to some embodiments. The method 1100 is implemented in some embodiments of a processing unit such as the GPU 130 shown in FIG. 1, which is configured to access, on a pixel-by-pixel basis, information representative of pixels in the block that has been encoded by another processing unit such as the CPU 115 shown in FIG. 1 according to a variable bit rate encoding scheme.

At block 1105, the processing unit generates the four coordinates (u, v, s, t) that identify a pixel in a block of an image from an lightfield dataset. The identified pixel is to be rendered by the processing unit for presentation on a display. For example, the processing unit can generate the values of the four coordinates (u, v, s, t) using a ray tracing algorithm or other technique for identifying pixels that are to be rendered.

At block 1110, the processing unit identifies the image in the lightfield dataset based on the (u, v) coordinates. At block 1115, the processing unit uses the (s, t) coordinates to identify a block descriptor for a block that includes the pixel, as discussed herein. The processing unit can then access the block descriptor for the block.

At decision block 1120, the processing unit determines whether the pixels in the block are represented by single color, e.g., using a value of a first field of the block descriptors such as a reserved value of a bucket index in the block descriptor. If so, the method 1100 flows to block 1125 and the processing unit reads the value of the single color from a second field of the block descriptor such as a block index field in the block descriptor. As discussed herein, In some embodiments, the processing unit can determine whether the values of the pixels in the block are represented by a limited range of colors, such as a range of colors that can be represented by a color ramp. In that case, the processing unit can read parameters that define the range of colors from the second field of the block descriptor. If the pixels in the block are not represented by single color (or a color ramp or other parameterization), the method 1100 flows to decision block 1130.

At decision block 1130, the processing unit determines whether the block associated with the block descriptor is an intra block (i.e., the values of the pixels in the block are encoded at a selected rate) or an inter block (i.e., the residual values of the pixels in the block are encoded at the selected rate). If the block is an intra block, the method 1100 flows to block 1135. If the block is an inter block, the method 1100 flows to block 1140.

At block 1135, the processing unit identifies a bucket that holds encoded information representative of the pixels in the intra block based on the first field in the block descriptor, e.g., the bucket index. At block 1145, the processing unit identifies a base address (or a starting point) of the intra block from the second field of the block descriptor, e.g., the block index. At block 1150, the processing unit decodes the encoded information representative of the value of the pixel that is accessed from a location in the bucket indicated by the coordinates (s, t). The processing unit can then use the decoded values of the pixels to render the pixel for presentation on the display.

At block 1140, the processing unit identifies a bucket that holds encoded information representative of the pixels in the inter block based on the first field in the block descriptor, e.g., the bucket index. At block 1155, the processing unit identifies a base address (or a starting point) of the inter block from the second field of the block descriptor, e.g., the block index. At block 1160, the processing unit decodes the encoded information representative of the residual value of the pixel that is accessed from a location in the bucket indicated by the coordinates (s, t). At block 1165, the processing unit adds the residual value of the pixel to a reference value of a pixel in a reference image that is indicated by a motion vector associated with the inter block. The processing unit accesses the motion vector and the reference image from the GPU-accessible memory. The value of the pixel is equal to the sum of the residual value and the reference value. The processing unit can then use the decoded values of the pixels to render the pixel for presentation on the display.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    encoding, at a first processing unit of an acquisition and display system, information that represents values of pixels in a block of an image in a lightfield dataset at a first bit rate that is selected from a plurality of bit rates;
    generating, at the first processing unit, a block descriptor that includes information indicating locations of the encoded information for each pixel in a memory, wherein the block descriptor is configured to provide a field indicating wherein the block descriptor is configured to provide a field indicating whether encoded information is included in the block descriptor; and wherein a second processing unit of the acquisition and display system is configured to decompress the encoded information that represents values of pixels of the image in the lightfield dataset on a pixel-by-pixel basis using the block descriptor; and
    storing the block descriptor and the encoded information in the memory.

2. The method of claim 1, wherein storing the encoded information comprises storing the encoded information in a first bucket associated with the first bit rate, wherein the first bucket is one of a plurality of buckets associated with the plurality of bit rates.

3. The method of claim 2, wherein generating the block descriptor comprises generating the block descriptor including a first field having a value that indicates a starting location of the first bucket in the memory and a second field having a value that indicates a starting location of the encoded information in the first bucket.

4. The method of claim 1, wherein generating the block descriptor comprises generating the block descriptor that includes a first field, said first field being the field having a value that indicates that the encoded information is included in a second field of the block descriptor.

5. The method of claim 4, wherein generating the block descriptor includes generating the block descriptor having a color value in the second field that represents a color of all the pixels in the block.

6. The method of claim 1, wherein encoding the information further comprises:
    determining at least one motion vector that associates the pixels in the block with reference pixels in a reference image;
    determining residual values that are equal to a difference between the values of the pixels and reference values of the reference pixels;
    encoding the residual values of the pixels at the first bit rate; and
    storing the at least one motion vector and the encoded residual values of the pixels in the memory.

7. The method of claim 6, wherein generating the block descriptor comprises generating the block descriptor having a first value of a third field that indicates that the at least one motion vector and the encoded residual values of the pixels are stored in the memory.

8. The method of claim 1, wherein generating the block descriptor comprises generating the block descriptor having a second value of a third field that indicates that encoded values of the pixels are stored in the memory.

9. A method, comprising:
accessing, at a first processing unit of an acquisition and display system, a block descriptor that indicates locations of information representative of values of pixels in a block of an image in a lightfield dataset, wherein the information is encoded at a first bit rate that is selected from a plurality of bit rates and wherein the block descriptor is configured to provide a field indicating whether encoded information is included in the block descriptor;
decoding, at the first processing unit, the encoded information representative of a value of a pixel in the block; and
rendering, at the first processing unit, the value of the pixel for presentation on a display.

10. The method of claim 9, wherein accessing the block descriptor comprises accessing the block descriptor based on a set of four coordinates that identify the pixel in the block of the image.

11. The method of claim 9, wherein decoding the encoded information comprises determining that a value of a first field corresponding to the field of the block descriptor indicates that encoded information representative of the value of the pixel is stored in a second field of the block descriptor.

12. The method of claim 11, wherein decoding the encoded information comprises determining the value of the pixel based on the encoded information that is stored in the second field.

13. The method of claim 9, wherein decoding the encoded information comprises determining that the value of a first field of the block descriptor indicates that the encoded information is stored in a first bucket associated with the first bit rate, wherein the first bucket is one of a plurality of buckets associated with the plurality of bit rates.

14. The method of claim 13, further comprising:
accessing a value of a third field of the block descriptor that indicates whether the encoded information representative of the value of the pixel comprises a motion vector and an encoded residual value of the pixel.

15. The method of claim 14, wherein decoding the encoded information comprises accessing the encoded information stored in the first bucket and decoding the encoded information based on the first bit rate to generate the value of the pixel in response to the value of the third field indicating that the encoded information representative of the value of the pixel comprises the value of the pixel and does not comprise the motion vector and the encoded residual value of the pixel.

16. The method of claim 14, wherein decoding the encoded information further comprises, in response to the value of the third field indicating that the encoded information representative of the value of the pixel comprises the motion vector and the encoded residual value of the pixel:
accessing the motion vector that associates the pixel with a reference pixel in a reference image that is stored in a memory;
decoding, based on the first bit rate, the encoded information representative of the residual value; and
determining the value of the pixel by adding the residual value to a value of the reference pixel.

17. An apparatus, comprising:
a first processing unit of an acquisition and display system configured to encode information that represents values of pixels in a block of an image in a lightfield dataset at a first bit rate that is selected from a plurality of bit rates and generate a block descriptor that includes information indicating locations of the encoded information for each pixel wherein the block descriptor is configured to provide a field indicating whether encoded information is included in the block descriptor; and
a memory configured to store the block descriptor and the encoded information in a format that is accessible by a second processing unit of the acquisition and display system, wherein the second processing unit is configured to decompress the encoded information that represents values of pixels of the image in the lightfield dataset on a pixel-by-pixel basis using the block descriptor.

18. The apparatus of claim 17, wherein the memory is configured to store the encoded information in a first bucket associated with the first bit rate, wherein the first bucket is one of a plurality of buckets associated with the plurality of bit rates.

19. The apparatus of claim 18, wherein the first processing unit is configured to generate the block descriptor including a first field having a value that indicates a starting location of the first bucket in the memory and a second field having a value that indicates a starting location of the encoded information in the first bucket.

20. The apparatus of claim 17, wherein the first processing unit is configured to generate the block descriptor that includes a first field having a value that indicates that the encoded information is included in a second field of the block descriptor.

21. The apparatus of claim 20, wherein the first processing unit is configured to generate the block descriptor having a color value in the second field that represents a color of all the pixels in the block.

22. The apparatus of claim 17, wherein the first processing unit is configured to:
determine at least one motion vector that associates the pixels in the block with reference pixels in a reference image;
determine residual values that are equal to a difference between the values of the pixels and reference values of the reference pixels;
encode the residual values of the pixels at the first bit rate; and
store the at least one motion vector and the encoded residual values of the pixels in the memory.

23. The apparatus of claim 22, wherein the first processing unit is configured to generate the block descriptor having a first value of a third field that indicates that the at least one motion vector and the encoded residual values of the pixels are stored in the memory.

24. The apparatus of claim 17, wherein the first processing unit is configured to generate the block descriptor having a second value of a third field that indicates that encoded values of the pixels are stored in the memory.

25. An apparatus, comprising:
a memory configured to store a block descriptor that indicates locations of information representative of values of pixels in a block of an image in a lightfield dataset, wherein the information is encoded at a first bit rate that is selected from a plurality of bit rates and wherein the block descriptor is configured to provide a field indicating whether encoded information is included in the block descriptor; and a first processing unit of an acquisition and display system is configured to access, on a pixel-by-pixel basis, the encoded information representative of a value of a pixel in the block, decode the encoded information, and render the value of the pixel for presentation on a display.

26. The apparatus of claim 25, wherein the first processing unit is configured to access the block descriptor based on a set of four coordinates that identify the pixel in the block of the image.

27. The apparatus of claim 25, wherein the first processing unit is configured to determine that a value of a first field corresponding to the field of the block descriptor indicates that encoded information representative of the value of the pixel is stored in a second field of the block descriptor.

28. The apparatus of claim 27, wherein the first processing unit is configured to determine the value of the pixel based on the encoded information that is stored in the second field.

29. The apparatus of claim 25, wherein the first processing unit is configured to determine that the value of a first field of the block descriptor indicates that the memory stores the encoded information in a first bucket associated with the first bit rate, wherein the first bucket is one of a plurality of buckets associated with the plurality of bit rates.

30. The apparatus of claim 29, wherein the first processing unit is configured to access a value of a third field of the block descriptor that indicates whether the encoded information representative of the value of the pixel comprises a motion vector and an encoded residual value of the pixel.

31. The apparatus of claim 30, wherein the first processing unit is configured to access the encoded information stored in the first bucket and decode the encoded information based on the first bit rate to generate the value of the pixel in response to the value of the third field indicating that the encoded information representative of the value of the pixel comprises the value of the pixel and does not comprise the motion vector and the encoded residual value of the pixel.

32. The apparatus of claim 30, wherein, in response to the value of the third field indicating that the encoded information representative of the value of the pixel comprises the motion vector and the encoded residual value of the pixel, the first processing unit is configured to:

access the motion vector that associates the pixel with a reference pixel in a reference image that is stored in the memory;

decode, based on the first bit rate, the encoded information representative of the residual value; and determine the value of the pixel by adding the residual value to a value of the reference pixel.

* * * * *

UNITED STATES PATENT AND TRADEMARK OFFICE
CERTIFICATE OF CORRECTION

Page 1 of 1

PATENT NO. : 10,375,398 B2
APPLICATION NO. : 15/468741
DATED : August 6, 2019
INVENTOR(S) : Stuart Abercrombie It is certified that error appears in the above-identified patent and that said Letters Patent is hereby corrected as shown below:

In the Claims

At Column 14 Line 25, please correct "wherein the block descriptor is configured to provide a field indicating wherein the block descriptor is configured to provide a field indicating whether" to be --wherein the block descriptor is configured to provide a field indicating whether--

Signed and Sealed this
Nineteenth Day of November, 2019

Andrei Iancu
*Director of the United States Patent and Trademark Office*